(12) United States Patent
Tajima et al.

(10) Patent No.: US 8,245,839 B2
(45) Date of Patent: Aug. 21, 2012

(54) CONVEYANCE RECEIVER FOR HONEYCOMB FORMED ARTICLE, AND CONVEYANCE APPARATUS AND CONVEYANCE METHOD USING THE CONVEYANCE RECEIVER

(75) Inventors: Yuichi Tajima, Nagaya (JP); Keita Morishita, Tokoname (JP); Yasunori Yamazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 163 days.

(21) Appl. No.: 12/883,281

(22) Filed: Sep. 16, 2010

(65) Prior Publication Data

US 2011/0083942 A1 Apr. 14, 2011

(30) Foreign Application Priority Data

Oct. 8, 2009 (JP) .................................. 2009-234551

(51) Int. Cl.
*B65G 29/00* (2006.01)
(52) U.S. Cl. .............................. 198/867.11; 198/803.14
(58) Field of Classification Search ............. 198/867.11, 198/867.13, 803.14, 867.15, 867.14
See application file for complete search history.

(56) References Cited

U.S. PATENT DOCUMENTS

| | | | | | |
|---|---|---|---|---|---|
| 5,183,151 | A | * | 2/1993 | Powell, Jr. ................ | 198/867.11 |
| 5,196,062 | A | * | 3/1993 | Bergmann et al. ........ | 198/867.11 |
| 5,429,226 | A | * | 7/1995 | Ensch et al. ............. | 198/803.14 |
| 6,321,904 | B1 | * | 11/2001 | Mitchell .................. | 198/867.11 |
| 6,491,157 | B1 | * | 12/2002 | Kolling et al. ........... | 198/867.11 |
| 8,132,664 | B2 | * | 3/2012 | Paskell et al. ............ | 198/803.14 |
| 2002/0046925 | A1 | | 4/2002 | Miyakawa et al. | |
| 2004/0076705 | A1 | | 4/2002 | Ishikawa et al. | |
| 2007/0194480 | A1 | | 8/2007 | Ishikawa et al. | |

FOREIGN PATENT DOCUMENTS

| JP | 2002-046856 A1 | 2/2002 |
|---|---|---|
| JP | 2002-103325 A1 | 4/2002 |
| JP | 2004-142160 A1 | 5/2004 |

* cited by examiner

*Primary Examiner* — James R Bidwell
(74) *Attorney, Agent, or Firm* — Burr & Brown (57) ABSTRACT

There is provided a conveyance receiver 1 having a bottom face 6 formed in parallel with the conveyance path to abut against the conveyance path and a support face 7 formed to match a shape of an outer periphery 5 of the honeycomb formed article 4. The support face 7 is made of a cured porous polyurethane resin material having a Shore D hardness Hs of $40 \leq Hs \leq 70$.

20 Claims, 3 Drawing Sheets

CONVEYANCE RECEIVER FOR HONEYCOMB FORMED ARTICLE, AND CONVEYANCE APPARATUS AND CONVEYANCE METHOD USING THE CONVEYANCE RECEIVER

BACKGROUND OF THE INVENTION AND RELATED ART STATEMENT

The present invention relates to a conveyance receiver for supporting and conveying a ceramic honeycomb formed article subjected to extrusion forming. More specifically, the present invention relates to a conveyance receiver capable of conveying a clayey honeycomb formed article without being deformed and a conveyance apparatus and a conveyance method using the conveyance receiver.

Conventionally, as an example of a forming method of a honeycomb formed article, there has been known an extrusion forming method. In this method, a die having a desired shape is attached to the extrusion outlet of an extruder where the extrusion direction is set in a horizontal direction, and a ceramic material put in the extruder is successively extruded from the die to form a honeycomb formed article having a columnar shape. The extruded honeycomb formed article having a columnar shape is carried over the conveyance path with being held by a conveyance receiver and subjected to each of the steps of cutting, drying, firing, and the like, to give a honeycomb structure as a final form.

Here, since a honeycomb formed article right after the extrusion forming is clayey, it is very soft and easily deformed. In order to obtain a final formed article having good quality, it is necessary to convey the honeycomb formed article right after the extrusion forming to the following steps with supporting it lest deformation should be caused. In particular, the receiver directly supporting a cylindrical honeycomb formed article generally has a depressed top portion so as to correspond with the outer peripheral shape of the cylindrical honeycomb formed article. However, since high shape accuracy is necessary to suppress the deformation of the formed article to be supported, securement of easy and accurate processability of the material used for the receiver has conventionally been one of important conditions. For example, in the case that the depressed portion of the conveyance receiver is formed to be smaller than the outer periphery size of a honeycomb formed article, collapse or deformation is caused in the formed article when it is placed on the receiver. On the other hand, in the case that the depressed portion of the conveyance receiver is formed to be larger than the outer periphery size of a honeycomb formed article to form a gap between the outer periphery of the formed article placed on the receiver and the depressed portion of the receiver, deformation is caused in the honeycomb formed article by bias of contact pressure between the outer periphery of the formed article and the inner surface of the depressed portion, movement of the formed article upon conveyance, and the like, and a good final product cannot be obtained. That is, in order to reduce the defect incidence, it is necessary that the depressed shape of the conveyance receiver corresponds with the outer peripheral shape of the honeycomb formed article to be supported with high accuracy, and a material where such accurate processing into a depressed shape is realized has to be employed.

In addition, since a honeycomb formed article right after the extrusion contains much water, a material used for the receiver has conventionally been required to satisfy various conditions such as releasability and hygroscopicity. For example, when a clayey honeycomb formed article having high humidity sticks to the conveyance receiver, release from the receiver is hard, which may cause deformation or collapse of the formed article. In addition, even in one honeycomb formed article, water hardly evaporates from the portion closely adhering to the receiver, while water easily evaporates from the portion in contact with air without adhering to the receiver. Therefore, water content inside the formed article is uneven, which may cause a crack in the final product. That is, in the formed article, it is necessary to secure minimum evaporation even in the portion in contact with the receiver. Thus, as the material for the receiver, a material in appropriate conditions should be employed lest the honeycomb formed article and the receiver should adhere to each other.

As described above, selection of a material having desired properties has conventionally been a serious problem for a conveyance receiver of a honeycomb formed article. For example, JP-A-2002-046856 discloses a conveyance receiver for a honeycomb formed article, where a Styrofoam support portion is provided on an aluminum base with the support portion being covered with a buffer material. In addition, JP-A-2002-103325 discloses a foamed article provided on a base plate having high strength, and JP-A-2004-142160 discloses a conveyance receiver of a low repulsion material capable of easy transformation.

However, in a conveyance receiver disclosed in JP-A-2002-046856, because of the properties of the material of Styrofoam, there is a limitation in processing accuracy. Therefore, upon processing into a depressed shape, variance in shape accuracy is caused among the receivers to have a problem of causing interindividual differences. In addition, also the variance in thickness of an adhesive for bonding the buffer material and the support portion serves as a cause of interindividual differences in the depressed shape among the receivers. In addition, since each of the materials employed for the conveyance receivers disclosed in JP-A-2002-103325 and JP-A-2004-142160 is a foaming material having cushioning properties and relatively low density and low hardness, it is hard to realize high processing accuracy as in the case of JP-A-2002-046856.

SUMMARY OF THE INVENTION

The present invention has been made in view of the aforementioned problem and aims to provide a conveyance receiver for honeycomb formed article capable of holding and conveying a soft clayey honeycomb formed article without being deformed and a conveyance apparatus and a conveyance method using the conveyance receiver.

As a result of earnest study in view of the aforementioned problems, the inventor of the present invention found that, by using a cured porous polyurethane resin material having a certain hardness instead of a conventionally used foaming material having low repulsion, it is possible to manufacture a conveyance receiver for a honeycomb formed article with excellent releasability, hygroscopicity, and the like, and very low defect incidence in a conveyance step easily at low costs. That is, according to the present invention, there are provided the following conveyance receiver for a honeycomb formed article, conveyance apparatus, and conveyance method.

[1] A conveyance receiver for supporting a clayey honeycomb formed article extruded from a die and conveying the honeycomb formed article on a conveyance path to the next step, the conveyance receiver comprising: a bottom face formed in parallel with the conveyance path to abut against the conveyance path, and a support face formed to match a shape of a part of an outer periphery of the honeycomb formed article and support the honeycomb formed article;

wherein at least the support face is made of a cured porous polyurethane resin material having a Shore D hardness Hs of $40 \leq Hs \leq 70$.

[2] A conveyance receiver for a honeycomb formed article according to [1], wherein the support face is formed so that the profile tolerance C is in the range of $C \leq 300$ μm toward the outside in the radial direction of the honeycomb formed article when a design value based on a shape of the part of the outer periphery of the honeycomb formed article to be supported is employed as a reference, and the straightness tolerance Sa of the line connecting two points closest to the bottom face in both the end portions in the conveyance direction is in the range of $Sa \leq 200$ μm when a design value based on the bottom face is employed as a reference.

[3] A conveyance receiver for a honeycomb formed article according to [1] or [2], wherein at least the support face is made of the cured porous polyurethane resin material having a porosity Po in the range of $10\% \leq Po \leq 75\%$.

[4] A conveyance receiver for a honeycomb formed article according to any one of [1] to [3], wherein at least the support face is made of the cured porous polyurethane resin material having an apparent specific gravity D in the range of $300 \text{ kg/m}^3 \leq D \leq 1000 \text{ kg/m}^3$.

[5] A conveyance receiver for a honeycomb formed article according to any one of [1] to [4], wherein the support face is formed to have an arithmetic mean height Ra in the range of $10 \text{ μm} \leq Ra \leq 30 \text{ μm}$.

[6] A conveyance receiver for a honeycomb formed article according to any one of [1] to [5], wherein the cured porous polyurethane resin material is chemical wood.

[7] A conveyance apparatus using a conveyance receiver for a honeycomb formed article according to any one of [1] to [6], the conveyance apparatus comprising: a conveyance path for placing and carrying the conveyance receiver supporting the honeycomb formed article, a receiver collection portion for collecting an empty conveyance receiver after conveying a formed article, and a receiver supply portion for supplying the collected conveyance receiver to the conveyance path again; wherein the conveyance path is positioned so that the straightness tolerance Sb of the line passing through the center in the width direction of the face for placing the receiver and extending in the conveyance direction of the conveyance path is in the range of $Sb \leq 500$ μm when the design value set in parallel with a line passing through the center of the open portion of the die and extending in a horizontal direction is employed as a reference.

[8] A conveyance method using a conveyance apparatus for a honeycomb formed article according to [7], the method comprising: a honeycomb formed article extrusion step where a ceramic material having a compression stress of 20 to 30 kPa at a compression strain of 2% is successively extruded from an extruder provided with the die at the outlet to obtain the honeycomb formed article having a columnar shape, a receiver support step where the extruded honeycomb formed article is supported by the empty conveyance receiver supplied by the receiver supply portion, and a conveyance step where the honeycomb formed article held by the conveyance receiver is conveyed to the next step at an almost the same rate as the extrusion rate of the honeycomb formed article.

According to a conveyance receiver for a honeycomb formed article, a conveyance apparatus, and a conveyance method of the present invention, a soft clayey honeycomb formed article can be supported and conveyed without being deformed, and the defect incidence in the conveyance step can be reduced to a great extent.

REFERENCE NUMERALS 1, 10: conveyance receiver, 2: extruder, 3: die, 4: honeycomb formed article, 5: outer periphery, 6: bottom face, 7: support face, 8: conveyance path, 9: receiver collection portion, 10: receiver supply portion

DETAILED DESCRIPTION OF THE INVENTION

Hereinbelow, embodiments of the present invention will be described with referring to drawings. The present invention is not limited to the following embodiments, and changes, modifications, and improvements may be made as long as they do not deviate from the scope of the present invention.

Figure 1:
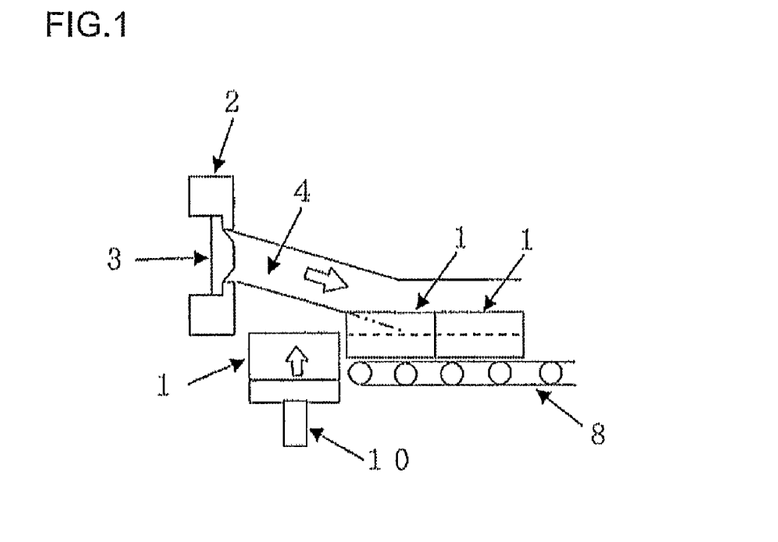
FIG. 1 is a schematic explanatory view showing the way an extrusion-formed honeycomb formed article is passed to a conveyance receiver of the present invention.

FIG. 1 is a schematic explanatory view showing the way an extrusion-formed honeycomb formed article is passed to a conveyance receiver of the present invention. Generally, in an extrusion-forming method for a honeycomb structure, as shown in FIG. 1, columnar honeycomb formed articles 4 in accordance with the shape of the die 3 are successively extruded from the die 3 attached to the extruder 2 and passed to the conveyance receivers 1 supplied by the receiver supply portion 10 on the conveyance path 8 located in front in the extrusion direction. At this time, the conveyance receiver 1 is placed in a state that it abuts against the upper surface of the conveyance path 8, and the conveyance path 8 is preferably designed so as to carry the conveyance receivers 1 forward in the conveyance direction in conjunction with the extrusion rate of the honeycomb formed articles 4.

Figure 2:
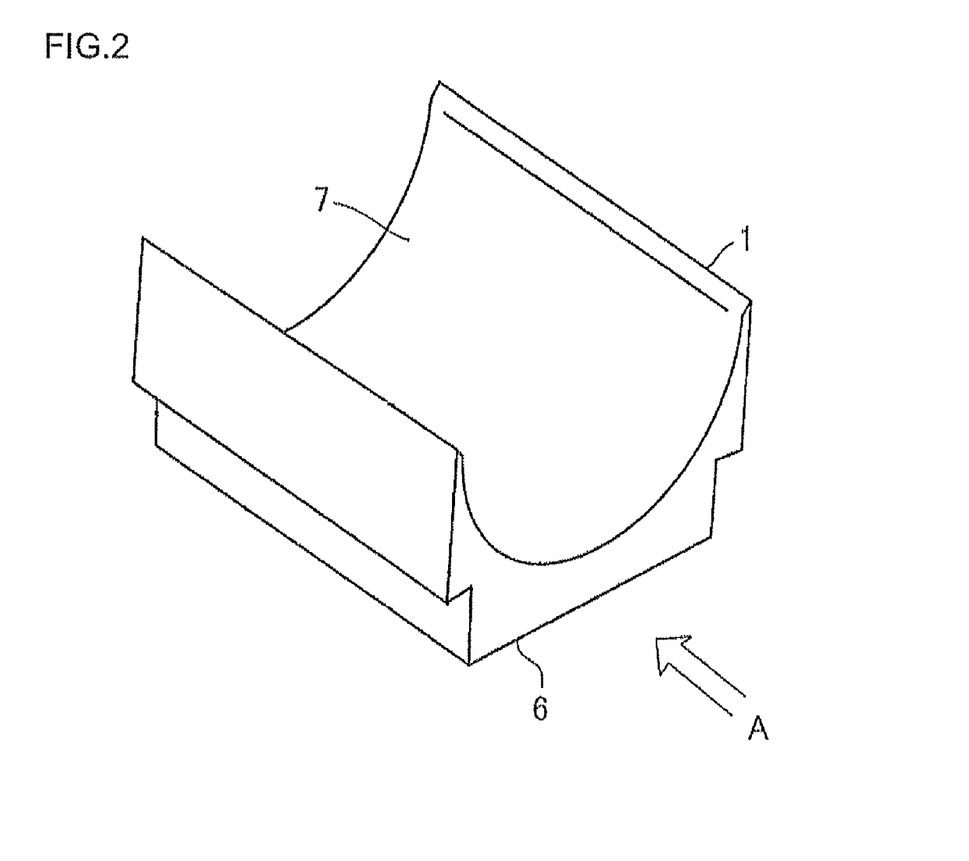
FIG. 2 is a schematic perspective view showing an embodiment of a conveyance receiver for a honeycomb formed article of the present invention.
Figure 3:
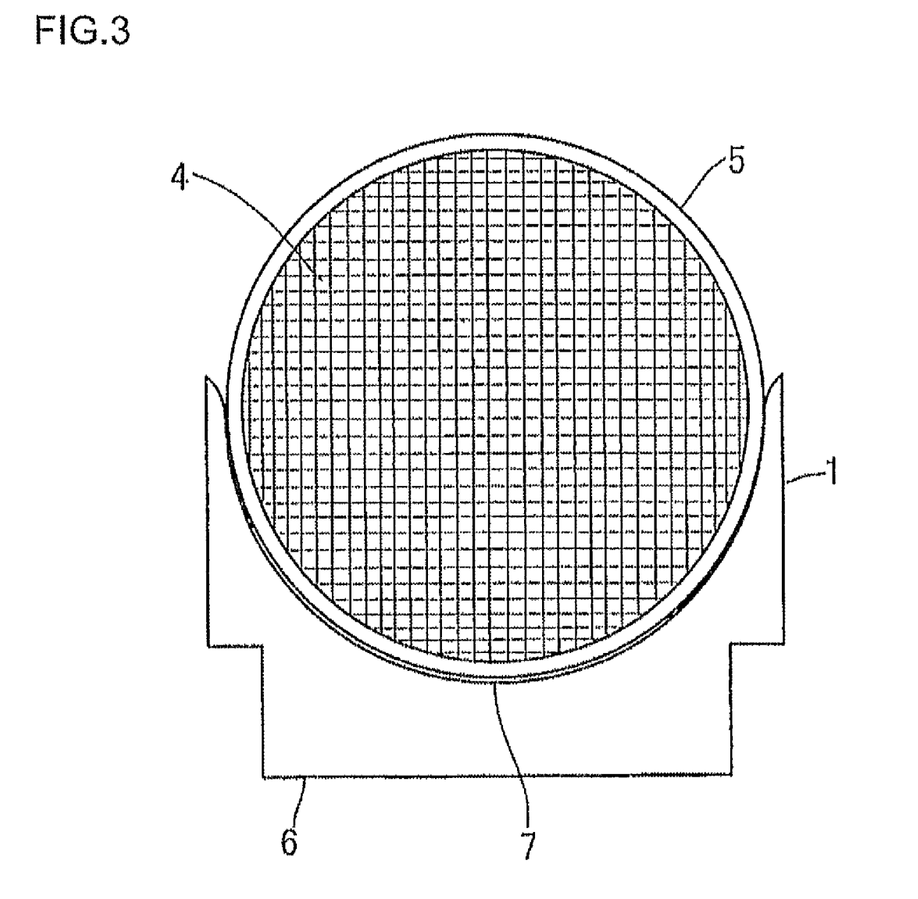
FIG. 3 is a schematic front view of a state that a honeycomb formed article is held by an embodiment of the conveyance receiver shown in FIG. 2, viewed from A direction.

FIG. 2 is a schematic perspective view showing an embodiment of a conveyance receiver for a honeycomb formed article of the present invention. FIG. 3 is a schematic front view of a state that a honeycomb formed article is held by an embodiment of the conveyance receiver shown in FIG. 2, viewed from A direction. The conveyance receiver 1 of the present invention supports the clayey honeycomb formed article 4 extruded from the die 3 and conveys it to the next step. As shown in FIGS. 2 and 3, the conveyance receiver 1 has a bottom face 6 formed in parallel with the conveyance path to abut against the conveyance path and a support face 7 formed to match a shape of an outer periphery 5 of the honeycomb formed article 4 and supporting the honeycomb formed article 4. Here, the outer periphery 5 of the honeycomb formed article 4 means a circumference of a cylindrical honeycomb formed article 4, that is, a portion formed by a side face parallel of the extrusion/conveyance direction of the honeycomb formed article 4. The support face 7 of the conveyance receiver 1 is designed and processed to have almost the same profile shape as the curve on the lower side of the outer periphery 5 of the honeycomb formed article 4 as shown in FIG. 3, and the shape is suitably determined in accordance with the outer peripheral shape of the honeycomb formed article 1 to be supported. For example, besides a shape having a circular cross section in a direction perpendicular to the extrusion/conveyance direction as shown in FIG. 3, the shape can corresponds with a honeycomb formed articles 1 having various cross sections each having an elliptic shape, an oval shape, a racetrack shape, or the like. In the case of supporting and conveying a honeycomb formed article 1 having a circular cross section, as shown in FIG. 3, design and processing are preferably performed so that about half the honeycomb formed article 1 on the lower side may engage the depression portion of the conveyance receiver 1.

In a conveyance receiver 1 of the present invention, it is preferable that at least the support face 7 is made of a cured porous polyurethane resin material having a Shore D hardness Hs of $40 \leq Hs \leq 70$. By selecting a cured porous polyurethane resin material in such a hardness range, it becomes possible to easily produce article satisfying the aforementioned profile and straightness with no variance in shape accuracy among the receivers. When a material having a Hs of below 40 is employed, the material is soft during cutting to cause deformation in a cut portion by a cutting reaction force of a blade, and desired high shape accuracy cannot be realized, which is not preferable.

In addition, when Hs is below 40, a surface of a support face 7 of the honeycomb formed article 4 deforms under its own weight to cause a contact defect in the honeycomb formed article 4, which is not preferable. On the other hand, when a material having a Hs of above 70 is used, a material is hard, thereby taking time for the cutting processing and accelerating abrasion of drill. This is not preferable because it leads to increase in processing costs. Incidentally, in the present specification, Shore D hardness means a value measured according to ISO 868.

In a conveyance receiver of a honeycomb formed article of the present invention, the support face 7 is preferably formed so that the profile tolerance C is in the range of $C \leq 300$ μm toward the outside in the radial direction of the honeycomb formed article 4 when a design value based on a shape of a part of the outer periphery of the honeycomb formed article 4 to be supported is employed as a reference. In addition, in the range from both the end portions in the circumferential directions of the support face 7 to the positions of 30° obliquely downward, the profile tolerance C is preferably within the range of $100 \text{ μm} \leq C \leq 300$ μm toward the outside in a radial direction of the honeycomb formed article 4. By designing in such a manner, there can be reduced occurrence of defects due to contact of the outer periphery of the honeycomb formed article 4 with both the end portions in the circumferential direction of the support face 7. Here, the profile tolerance is provided by JIS B 0021 and can be obtained by three dimensional measurement apparatus or the like. That is, when the profile tolerance C is 300 μm or less, upon mounting the honeycomb formed article 4 on the conveyance receiver 1, the outer peripheral shape of the honeycomb formed article 4 matches the depressed shape of the support face 7 of the conveyance receiver 1 with high accuracy to hardly cause a contact defect such as deformation in the honeycomb formed article 4. On the other hand, when the profile tolerance C is larger than 300 μm, there is a high probability of causing a contact defect in the honeycomb formed article 1, which is not preferable.

In addition, it is preferable that, in the support face 7, the straightness tolerance Sa of the line connecting two points closest to the bottom face in both the end portions in the conveyance direction is in the range of $Sa \leq 200$ μm when a design value based on the bottom face is employed as a reference. Here, the straightness tolerance is provided by JIS B 0021 and can be obtained by a three dimensional measurement apparatus or the like. That is, when the straightness tolerance Sa is 200 μm or less, upon mounting the honeycomb formed article 4 on the conveyance receiver 1, a part (lower portion) of the outer periphery 5 of the honeycomb formed article 4 matches the support face 7 of the conveyance receiver 1 with high accuracy to hardly cause a rib deformation defect in the lower portion in the outer periphery 5 of the honeycomb formed article 4. On the other hand, when the straightness tolerance Sa is above 200 μm, there is a high probability of occurrence of a rib deformation defect in a honeycomb formed article 1, which is not preferable.

In a conveyance receiver 1 of the present invention, it is preferable that at least the support face 7 is made of the cured porous polyurethane resin material having a porosity Po in the range of $10\% \leq Po \leq 75\%$. In the present specification, the porosity means a value measured in accordance with JIS R 1655. When the Po is below 10%, since hygroscopicity of the support face 7 is deteriorated, there is caused unevenness in water content inside the formed article between a portion in contact with the support face 7 and a portion out of contact with the support face 7 to sometimes cause a crack in a final product, which is not preferable. When the Po is above 75%, since rigidity of the receiver material becomes insufficient, deformation is caused during processing of the receiver, and the shape accuracy cannot be satisfied, which is not preferable.

In addition, in a conveyance receiver 1 of the present invention, the support face 7 is preferably made of the cured porous polyurethane resin material having an apparent specific gravity D in the range of $300 \text{ kg/m}^3 \leq D \leq 1000 \text{ kg/m}^3$. The apparent specific gravity in the present specification means a value measured in accordance with JIS R 1634. When the D is below 300 kg/m$^3$, each conveyance receiver 1 becomes light to deteriorate stability, and, according to vibrations upon conveyance, the impact reaches the honeycomb formed article 4 supported by the receiver to cause a contact defect in the honeycomb formed article 4, which is not preferable. In addition, when the D is above 1000 kg/m$^3$, each conveyance receiver 1 becomes heavy to deteriorate workability, which is not preferable. Therefore, the range of the apparent specific gravity D is preferably $300 \text{ kg/m}^3 \leq D \leq 1000 \text{ kg/m}^3$, more preferably $300 \text{ kg/m}^3 \leq D \leq 500 \text{ kg/m}^3$.

Further, in a conveyance receiver 1 of the present invention, the support face 7 is preferably formed to have an arithmetic mean height Ra in the range of $10 \text{ μm} \leq Ra \leq 30$ μm. In the present specification, the arithmetic mean height means a value measured with regard to the reference height of 20 mm in accordance with JIS B 0601. When the Ra is below 10 μm, the adhesion between the honeycomb formed article 4 and the support face 7 increases to cause deformation, collapse, or the like in a honeycomb formed article 4 upon demolding, which is not preferable. In addition, when Ra is above 30 μm, a scrape or the like may be caused in a portion in contact with the support face 7 of the outer periphery 5 of the honeycomb formed article 4, which leads to the raise of incidence of a rough surface defect of the honeycomb structure 4, which is not preferable.

In a conveyance receiver 1 of the present invention, it is preferable to use chemical wood as the cured porous polyurethane resin material. Chemical wood is a material where properties as in wood are artificially imparted by the use of polyurethane mainly and, since it is manufactured to be specialized in cutting processing, excellent in processability without damaging a drill. Examples of chemical wood include Raku-tool produced by RAMPF group Japan, K.K. As the drill for chemical wood, it is possible to use a general end mill.

There is no particular limitation on the honeycomb formed article which a conveyance receiver 1 of the present invention can support and convey. There can suitably be conveyed a honeycomb formed article made of a ceramic material having a compression stress of 20 to 30 kPa at a compression strain of 2% when a unconfined compression test of soils in accordance with JIS A 1216 is performed. Generally, when the formed article has a large diameter, small partition wall thickness, and wide cell pitch, rigidity of a honeycomb formed article becomes low to obtain a deformable honeycomb formed article. Therefore, it is preferable to suitably select material substances so that the material satisfies the aforementioned compression stress range.

Figure 4:
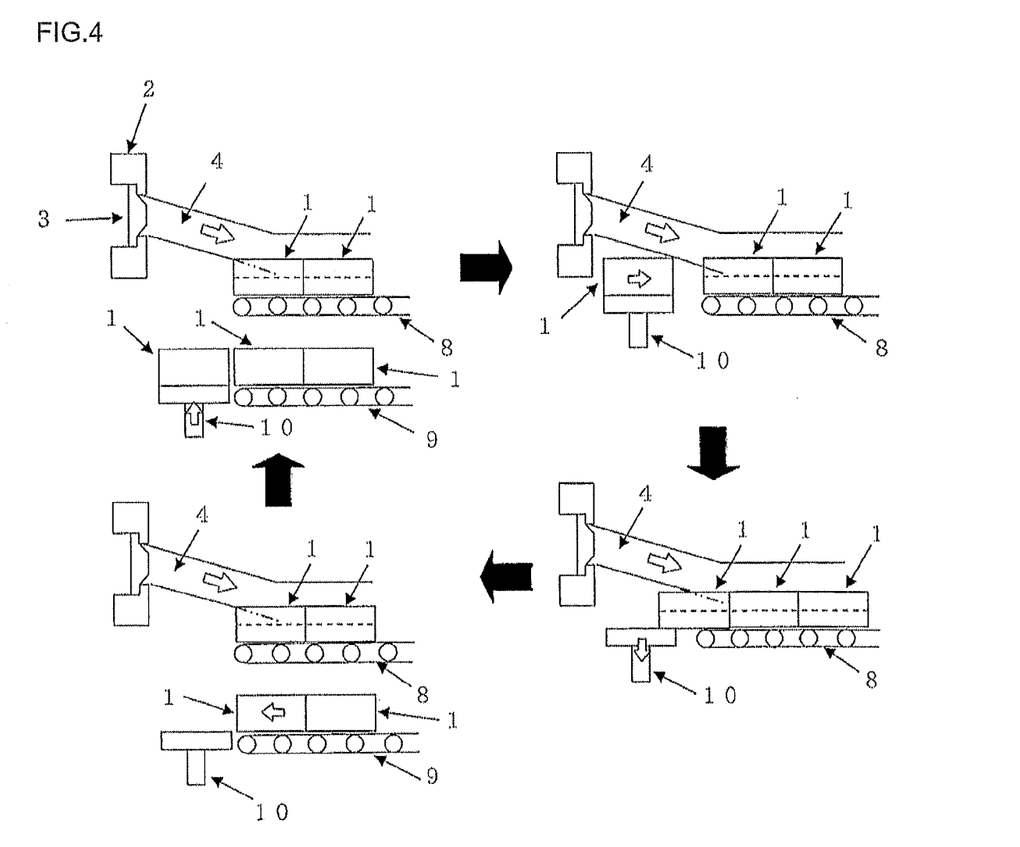
FIG. 4 is a schematic explanatory view showing the way the conveyance receivers are supplied in a conveyance apparatus for a honeycomb formed article of the present invention.

FIG. 4 is a schematic explanatory view showing the way the conveyance receivers are supplied in a conveyance apparatus for a honeycomb formed article of the present invention. As shown in FIG. 4, a conveyance apparatus for a honeycomb formed article of the present invention includes a conveyance receiver 1 as described above, a conveyance path 8 for placing and carrying the conveyance receiver 1 supporting the honeycomb formed article 4, a receiver collection portion 9 for collecting the empty conveyance receiver 1 after conveying a formed article, and a receiver supply portion 10 for supplying the collected conveyance receiver 1 to the conveyance path 8 again.

In the first place, an empty conveyance receiver 1 is supplied by the receiver supply portion 10 on the conveyance path 8 located forward in the extrusion direction of the honeycomb formed article 4. At this time, it is preferable that the conveyance path 8 is designed to carry the conveyance receiver 1 in the conveyance direction at about the same rate as the extrusion rate of the honeycomb formed article 4. Though there is no particular limitation on the conveyance path 8 as long as it is designed as described above, a conveyer type having a belt and a roller is particularly preferable.

The receiver supply portion 10 which supplied the empty conveyance receiver 1 to the conveyance path 8 returns to the pick up position of the conveyance receiver 1, carries the next conveyance receiver 1 to the receiver supply position, and supplies the receiver 1 to the conveyance path 8. Thus, the receiver supply portion 10 reciprocates between the receiver pick up position and the receiver supply position, thereby supplying the empty conveyance receiver 1 to the conveyance path 8 in sequence. Therefore, the receiver supply portion 10 is preferably designed so that it can reciprocate in the aforementioned manner and that the supply rate can be controlled in accordance with extrusion rate of a honeycomb formed article.

The conveyance receiver 1 supporting the honeycomb formed article 4 is carried in the conveyance direction on the conveyance path 8. The conveyance receiver 1 emptied again after conveying the honeycomb formed article 4 in the aimed step is collected by the receiver collection portion 9 and returned to the receiver pick up position. In this manner, in a conveyance apparatus of a honeycomb formed article of the present invention, by sequentially supplying a plurality of conveyance receivers 1, it is possible to convey honeycomb formed articles sequentially extruded.

At this time, as the positional relation of the extruder 2 and the conveyance path 8, it is preferable that the conveyance path 8 is positioned so that the straightness tolerance Sb of the line passing through the center in the width direction of the face (which is the upper face of the conveyance path 8) for placing the receiver and extending in the conveyance direction is in the range of $Sb \leq 500$ μm when the design value set in parallel with a line passing through the center of the opening portion of the die 3 and extending in a horizontal direction is employed as a reference. When the Sb value is above 500 μm horizontality of the conveyance path 8 cannot be maintained, and, upon placing and conveying the conveyance receiver 1, deformation or the like may be caused in the supported honeycomb formed article, which is not preferable.

A conveyance method for a honeycomb formed article of the present invention is a conveyance method using the aforementioned conveyance apparatus, and the conveyance receiver 1 as described above is suitably used. More specifically, the method includes a honeycomb formed article extrusion step where a ceramic material is successively extruded from an extruder 2 provided with the die 3 at the outlet to obtain the honeycomb formed article 4 having a columnar shape, a receiver support step where the extruded honeycomb formed article 4 is supported by the empty conveyance receiver 1 supplied by the receiver supply portion 10, and a conveyance step where the honeycomb formed article 4 held by the conveyance receiver 1 is conveyed to the next step at an almost the same rate as the extrusion rate of the honeycomb formed article 4.

EXAMPLE

Hereinbelow, the present invention will be described in more detail on the basis of Examples. However, the present invention is by no means limited to these Examples.
(Honeycomb Formed Article Conveyance Experiment)

Ceramic materials such as alumina, silica, zirconia, siliconnitride, silicon carbide, and the like were kneaded and extruded sequentially from an extruder to obtain a columnar cylindrical honeycomb formed article. The honeycomb formed article was held by a conveyance receiver as shown in FIG. 1 and conveyed to each step on the conveyance path. At this time, as the conveyance receiver, there was used each of the receivers of Examples 1 to 21 and Comparative Examples 1 to 25 shown below. The honeycomb formed article mounted on the support face of the receiver and carried on the conveyance path was subjected to the steps of cutting, drying, firing, and the like to obtain a honeycomb structure as the final product. The obtained honeycomb structure was judged with regard to each of the items of A to J shown in Tables 1 to 6 to give a total judgment on the conveyance receiver which conveyed the honeycomb structure.
(A: Judgment of Contact Defect)

The contact defect such as a circularity defect of a honeycomb formed article caused by variance in shape accuracy of the conveyance receiver was measured by the use of an optical gauge. Specifically, in order to measure a contact defect in the vicinity of 45° obliquely downward of the circular columnar honeycomb formed article mounted on the conveyance receiver, that is, 45° obliquely right and left of the portion abutting against the support face of the conveyance receiver among the outer periphery of the honeycomb formed article, the honeycomb structure obtained above is set up on a rotary table of the optical gauge, and the shape was measured by a non-contact laser displacement meter to evaluate circularity. However, the position where the shape was measured was in the range of 180° of the lower portion of the honeycomb formed article. When the circularity is within 1 mm, it was judged as a good product, and, when the circularity is above 1 mm, it was judged as a product having a contact defect. The ratio of products having a contact defect to the whole 200 samples was defined as contact defective rate. When the contact defective rate was below 0.5%, it was judged that a good result was obtained, which is shown as "good" in the Tables. When the contact defective rate was 0.5% or more, it is shown as "bad" in the Tables.

(B: Judgment of Rib Deformation Defect)

A deformation such as strain or collapse caused in the ribs partitioning the cells of the honeycomb formed article was measured by the use of a measurement microscope. Specifically, the portion forming the lowermost portion of the honeycomb formed article when it was mounted on the conveyance receiver was observed from the cell extension direction of the honeycomb structure obtained above to measure the extent of the rib deformation. When the rib deformation amount was below 0.2 mm, it was judged as a good product, while, when the rib deformation amount was 0.2 mm or more, it was judged as a product having a deformation defect. The ratio of products having a deformation defect to the whole 200 samples was defined as a rib deformation defective rate. When the rib deformation defective rate was below 0.5%, it was judged as a good result, which is shown as "good" in the Tables. When the rib deformation defective rate was 0.5% or more, it is shown as "bad" in the Tables.

(C: Judgment of Rough Surface Defect)

The presence/absence of rough surface caused by friction with the support face in a portion abutting against the support face of the conveyance receiver in the outer periphery of the honeycomb formed article was confirmed by eye observation of the honeycomb structure obtained above. When no rough surface was confirmed by eye observation, it was judged as a good product, while, when rough surface was confirmed, it was judged as a product having a rough surface defect. The ratio of the products having a rough surface defect to the whole 200 samples was defined as the rough surface defective rate. When the rough surface defective rate was below 0.5%, it was judged as a good result, which is shown by "good" in the Tables. When the rough surface defective rate was 0.5% or more, it is shown by "bad" in the Tables.

(D: Judgment of Release Defect)

The presence/absence of a defect such as deformation or collapse caused in the honeycomb formed article upon being released from the receiver because of the adhesion of the portion abutting against the support face of the conveyance receiver among the outer periphery of a honeycomb formed article was confirmed by eye observation of the honeycomb structure obtained above. When no release defect could be confirmed by eye observation, it was judged as a good product, while, when a release defect could be confirmed, it was judged as a product having a release defect. The ratio of the products having a release defect to the whole 200 samples was defined as a release defective rate. When the release defective rate was below 0.5%, it was judged as a good result, which is shown as "good" in the Tables. In addition, when the release defective rate was 0.5% or more, it is shown by "bad" in the Tables.

(E: Judgment of Contact Defect by Deformation of Receiver)

The contact defect by deformation of a receiver of a honeycomb formed article caused by deformation upon conveying a conveyance receiver was judged in the same manner as the aforementioned judgment of a contact defect (A). However, the position where the shape was measured was in the range of 180° of the lower portion of the honeycomb formed article. When the circularity was within 1 mm, it was judged as a good product, and, when the circularity was above 1 mm, it was judged as a product having a contact defect by deformation of the receiver. The ratio of products having a contact defect by deformation of the receivers to the whole 200 samples was defined as contact defective rate. When the contact defective rate by deformation of a receiver was below 0.5%, it was judged that a good result was obtained, which is shown as "good" in the Tables. When the contact defective rate by deformation of a receiver was 0.5% or more, it is shown as "bad" in the Tables.

(F: Judgment of Processing Time)

Time required for manufacturing one conveyance receiver by cutting processing was measured and defined as processing time. When the processing time was 30 min./unit or less, it was shown as "good" in the Tables. When the processing time was above 30 min./unit, it was shown as "bad" in the Tables.

(G: Judgment of Drill Life Span)

The number of the conveyance receivers able to be manufactured with one cutting drill was counted. When the number was above 10, it is shown by "good" in the Tables. When the number was 10 or less, it is shown by "bad" in the Tables.

(H: Judgment of Crack Defect)

The presence/absence of a crack of a final product due to uneven water content inside the honeycomb formed article was confirmed by eye observation of the honeycomb structure obtained above. When no crack was confirmed by eye observation, it was judged as a good product, while, when a crack was confirmed, it was judged as a product having a crack defect. The ratio of the products having a crack defect to the whole 200 samples was defined as a crack defective rate. When the crack defective rate was below 0.5%, it was judged as a good result, which is shown as "good" in the Tables. When the crack defective rate was 0.5% or more, it is shown as "bad" in the Tables.

(I: Judgment of Impact Contact Defect)

The impact contact defect of the honeycomb formed article caused by vibrations upon conveyance due to instability of the conveyance receiver was judged in the same manner as in the aforementioned judgment of a contact defect (A). However, the positions where the shape was measured were the entire periphery of the honeycomb formed article. When the circularity was within 1 mm, it was judged as a good product, and, when the circularity was above 1 mm, it was judged as a product having an impact contact defect. The ratio of products having an impact contact defect to the whole 200 samples was defined as impact contact defective rate. When the impact contact defective rate was below 0.5%, it was judged that a good result was obtained, which is shown as "good" in the Tables. When the impact contact defective rate by deformation of a receiver was 0.5% or more, it is shown as "bad" in the Tables.

(J: Judgment of Workability)

The weight of the conveyance receiver manufactured above was measured. When the weight of the receiver was 2 kg or less, it was judged to have excellent workability, which is shown by "good" in the Tables. When the weight of the receiver was above 2 kg, it is shown as "bad" in the Tables.

(Total Judgment of Receiver)

In the case that judgments of "good" were obtained in all the items of the aforementioned A to J, it was judged as a preferable Example, which is shown by "good" in the Tables. In the case that a judgment of "bad" was given at least one item, it is shown by "bad" in the Tables.

Comparative Example 1

Styrofoam serving as a conventional receiver material was cut by the use of an end mill to manufacture a conveyance receiver of Comparative Example 1 having a support face having almost the same shape as the outer peripheral shape of a circular columnar honeycomb formed article to be conveyed. At this time, it had a support face having a profile tolerance of 500 μm, a straightness tolerance of 700 μm, a shore D hardness of 30, an arithmetic mean height of 40 μm, a porosity of 75%, and an apparent specific gravity of 270 kg/m³. With respect to the conveyance receiver of Comparative Example 1 obtained above, the aforementioned honeycomb formed article conveyance experiment was performed to give a judgment for each item and a total judgment of the receiver. The results are shown in Tables 1 to 6.

Example 3

A cured polyurethane resin material was cut by the use of an end mill, and the conveyance receiver of Example 3 was manufactured in the same manner as in Comparative Example 1. At this time, it had a support face having a profile tolerance of 200 μm, a straightness tolerance of 100 μm, a shore D hardness of 50, an arithmetic mean height of 20 μm, a porosity of 64%, and an apparent specific gravity of 400 kg/m³. The conveyance receiver of Example 3 obtained above was subjected to a honeycomb structure conveyance experiment in the same manner as in Comparative Example 1 to give a judgment for each item and a total judgment of the receiver. The results are shown in Tables 1 to 6.

Examples 1, 2, 4, Comparative Example 2 to 7

A cured polyurethane resin material was cut by the use of an end mill to manufacture conveyance receivers of Examples 1, 2, and 4 and Comparative Examples 2 to 7 in the same manner as in Example 3. At this time, the receivers had a support face having a straightness tolerance of 100 μm, a shore D hardness of 50, an arithmetic mean height of 20 μm, a porosity of 64%, and an apparent specific gravity of 400 kg/m³ with the profile tolerance as shown in Table 1. The conveyance receivers of Examples 1, 2, 4 and Comparative Examples 2 to 7 were subjected to a honeycomb formed article conveyance experiment in the same manner as in Example 3 to give a judgment for each item and a total judgment of each receiver with the profile tolerance as the reference. The results are shown in Table 1.

TABLE 1

| | Judgment requirement | Profile tolerance (μm) | Straightness tolerance (μm) | Shore D hardness | Arithmetic mean height (μm) | Porosity (%) | Apparent specific gravity (g/cm³) |
|---|---|---|---|---|---|---|---|
| Comp. Ex. 1 | Profile | 500 | 700 | 30 | 40 | 75 | 270 |
| Example 1 | Profile | 50 | 100 | 50 | 20 | 64 | 400 |
| Example 2 | Profile | 100 | 100 | 50 | 20 | 64 | 400 |
| Example 3 | Profile | 200 | 100 | 50 | 20 | 64 | 400 |
| Example 4 | Profile | 300 | 100 | 50 | 20 | 64 | 400 |
| Comp. Ex. 2 | Profile | 400 | 100 | 50 | 20 | 64 | 400 |
| Comp. Ex. 3 | Profile | 500 | 100 | 50 | 20 | 64 | 400 |
| Comp. Ex. 4 | Profile | 700 | 100 | 50 | 20 | 64 | 400 |
| Comp. Ex. 5 | Profile | 1000 | 100 | 50 | 20 | 64 | 400 |
| Comp. Ex. 6 | Profile | 1500 | 100 | 50 | 20 | 64 | 400 |
| Comp. Ex. 7 | Profile | 2000 | 100 | 50 | 20 | 64 | 400 |

| | | A | | B | | C | | D | |
|---|---|---|---|---|---|---|---|---|---|
| | Judgment requirement | Contact defective rate (%) | Judgment of contact defect <0.5% | Rib deformation defective rate (%) | Judgment of rib deformation defect <0.5% | Rough surface defective rate (%) | Judgment of rough surface defect <0.5% | Release defective rate (%) | Judgment of release defect <0.5% |
| Comp. Ex. 1 | Profile | 2.0 | Bad | 5.0 | Bad | 3.0 | Bad | 0.0 | Good |
| Example 1 | Profile | 0.0 | Good | 0.0 | Good | 0.0 | Good | 0.0 | Good |
| Example 2 | Profile | 0.0 | Good | 0.0 | Good | 0.0 | Good | 0.0 | Good |
| Example 3 | Profile | 0.0 | Good | 0.0 | Good | 0.0 | Good | 0.0 | Good |
| Example 4 | Profile | 0.0 | Good | 0.0 | Good | 0.0 | Good | 0.0 | Good |
| Comp. Ex. 2 | Profile | 2.0 | Bad | 0.0 | Good | 0.0 | Good | 0.0 | Good |
| Comp. Ex. 3 | Profile | 2.5 | Bad | 0.0 | Good | 0.0 | Good | 0.0 | Good |
| Comp. Ex. 4 | Profile | 3.0 | Bad | 0.0 | Good | 0.0 | Good | 0.0 | Good |
| Comp. Ex. 5 | Profile | 3.5 | Bad | 0.0 | Good | 0.0 | Good | 0.0 | Good |
| Comp. Ex. 6 | Profile | 14.0 | Bad | 0.0 | Good | 0.0 | Good | 0.0 | Good |
| Comp. Ex. 7 | Profile | 19.5 | Bad | 0.0 | Good | 0.0 | Good | 0.0 | Good |

| | | E | | F | | G | |
|---|---|---|---|---|---|---|---|
| | Judgment requirement | Receiver deformation contact defective rate (%) | Judgment of receiver deformation contact defect <0.05% | Processing time (min./unit) | Judgment of processing time ≦30 min. | Number of receivers processed by one drill (unit(s)) | Judgment of drill life span >10 receivers |
| Comp. Ex. 1 | Profile | 4.0 | Bad | 20 | Good | 20 | Good |
| Example 1 | Profile | 0.0 | Good | 30 | Good | 20 | Good |
| Example 2 | Profile | 0.0 | Good | 30 | Good | 20 | Good |
| Example 3 | Profile | 0.0 | Good | 30 | Good | 20 | Good |
| Example 4 | Profile | 0.0 | Good | 30 | Good | 20 | Good |
| Comp. Ex. 2 | Profile | 0.0 | Good | 30 | Good | 20 | Good |
| Comp. Ex. 3 | Profile | 0.0 | Good | 30 | Good | 20 | Good |
| Comp. Ex. 4 | Profile | 0.0 | Good | 30 | Good | 20 | Good |

TABLE 1-continued

| | | | | | | | |
|---|---|---|---|---|---|---|---|
| Comp. Ex. 5 | Profile | 0.0 | Good | 30 | Good | 20 | Good |
| Comp. Ex. 6 | Profile | 0.0 | Good | 30 | Good | 20 | Good |
| Comp. Ex. 7 | Profile | 0.0 | Good | 30 | Good | 20 | Good |

| | | H | | I | | J | |
|---|---|---|---|---|---|---|---|
| | | Crack | | Impact contact | Judgment of impact | | |
| | Judgment requirement | defective rate (%) | Judgment of crack defect <0.5% | defective rate (%) | contact defect <0.5% | Receiver weight (kg) | Judgment of workability ≦2 kg | Total judgment on receiver |

| | | | | | | | | |
|---|---|---|---|---|---|---|---|---|
| Comp. Ex. 1 | Profile | 0.0 | Good | 1.0 | Bad | 0.54 | Good | Bad |
| Example 1 | Profile | 0.0 | Good | 0.0 | Good | 0.80 | Good | Good |
| Example 2 | Profile | 0.0 | Good | 0.0 | Good | 0.80 | Good | Good |
| Example 3 | Profile | 0.0 | Good | 0.0 | Good | 0.80 | Good | Good |
| Example 4 | Profile | 0.0 | Good | 0.0 | Good | 0.80 | Good | Good |
| Comp. Ex. 2 | Profile | 0.0 | Good | 0.0 | Good | 0.80 | Good | Bad |
| Comp. Ex. 3 | Profile | 0.0 | Good | 0.0 | Good | 0.80 | Good | Bad |
| Comp. Ex. 4 | Profile | 0.0 | Good | 0.0 | Good | 0.80 | Good | Bad |
| Comp. Ex. 5 | Profile | 0.0 | Good | 0.0 | Good | 0.80 | Good | Bad |
| Comp. Ex. 6 | Profile | 0.0 | Good | 0.0 | Good | 0.80 | Good | Bad |
| Comp. Ex. 7 | Profile | 0.0 | Good | 0.0 | Good | 0.80 | Good | Bad |

Example 5 Comparative Examples 8 to 11

A cured polyurethane resin material was cut by the use of an end mill to manufacture conveyance receivers of Example 5 and Comparative Examples 8 to 11 in the same manner as in Example 3. At this time, the receivers had a support face having a profile tolerance of 200 μm, a shore D hardness of 50, an arithmetic mean height of 20 μm, a porosity of 64%, and an apparent specific gravity of 400 kg/m³ with the straightness tolerance as shown in Table 2. The conveyance receivers of Example 5 and Comparative Examples 8 to 11 were subjected to a honeycomb formed article conveyance experiment in the same manner as in Example 3 to give a judgment for each item and a total judgment of each receiver with the straightness tolerance as the reference. The results are shown in Table 2.

TABLE 2

| | Judgment requirement | Profile tolerance (μm) | Straightness tolerance (μm) | Shore D hardness | Arithmetic mean height (μm) | Porosity (%) | Apparent specific gravity (g/cm³) |
|---|---|---|---|---|---|---|---|
| Comp. Ex. 1 | Straightness | 500 | 700 | 30 | 40 | 75 | 270 |
| Example 3 | Straightness | 200 | 100 | 50 | 20 | 64 | 400 |
| Example 5 | Straightness | 200 | 200 | 50 | 20 | 64 | 400 |
| Comp. Ex. 8 | Straightness | 200 | 300 | 50 | 20 | 64 | 400 |
| Comp. Ex. 9 | Straightness | 200 | 500 | 50 | 20 | 64 | 400 |
| Comp. Ex. 10 | Straightness | 200 | 700 | 50 | 20 | 64 | 400 |
| Comp. Ex. 11 | Straightness | 200 | 1500 | 50 | 20 | 64 | 400 |

| | | A | | B | | C | | D | |
|---|---|---|---|---|---|---|---|---|---|
| | | | | Rib | Judgment | Rough | Judgment | | |
| | Judgment requirement | Contact defective rate (%) | Judgment of contact defect <0.5% | deformation defective rate (%) | of rib deformation defect <0.5% | surface defective rate (%) | of rough surface defect <0.5% | Release defective rate (%) | Judgment of release defect <0.5% |
| Comp. Ex. 1 | Straightness | 2.0 | Bad | 5.0 | Bad | 3.0 | Bad | 0.0 | Good |
| Example 3 | Straightness | 0.0 | Good | 0.0 | Good | 0.0 | Good | 0.0 | Good |
| Example 5 | Straightness | 0.0 | Good | 0.0 | Good | 0.0 | Good | 0.0 | Good |
| Comp. Ex. 8 | Straightness | 0.0 | Good | 1.5 | Bad | 0.0 | Good | 0.0 | Good |
| Comp. Ex. 9 | Straightness | 0.0 | Good | 2.0 | Bad | 0.0 | Good | 0.0 | Good |
| Comp. Ex. 10 | Straightness | 0.0 | Good | 4.5 | Bad | 0.0 | Good | 0.0 | Good |
| Comp. Ex. 11 | Straightness | 0.0 | Good | 28.5 | Bad | 0.0 | Good | 0.0 | Good |

| | | E | | F | | G | |
|---|---|---|---|---|---|---|---|
| | | Receiver | Judgment of | | Judgment of | Number of | |
| | Judgment requirement | deformation contact defective rate (%) | receiver deformation contact defect <0.05% | Processing time (min./unit) | processing time ≦30 min. | receivers processed by one drill (unit(s)) | Judgment of drill life span >10 receivers |
| Comp. Ex. 1 | Straightness | 4.0 | Bad | 20 | Good | 20 | Good |
| Example 3 | Straightness | 0.0 | Good | 30 | Good | 20 | Good |

TABLE 2-continued

| | | | | | | | |
|---|---|---|---|---|---|---|---|
| Example 5 | Straightness | 0.0 | Good | 30 | Good | 20 | Good |
| Comp. Ex. 8 | Straightness | 0.0 | Good | 30 | Good | 20 | Good |
| Comp. Ex. 9 | Straightness | 0.0 | Good | 30 | Good | 20 | Good |
| Comp. Ex. 10 | Straightness | 0.0 | Good | 30 | Good | 20 | Good |
| Comp. Ex. 11 | Straightness | 0.0 | Good | 30 | Good | 20 | Good |

| | | H | | I | | J | |
| | | Crack | | Impact contact | Judgment of impact | | |
| | Judgment requirement | defective rate (%) | Judgment of crack defect <0.5% | defective rate (%) | contact defect <0.5% | Receiver weight (kg) | Judgment of workability ≦2 kg | Total judgment on receiver |
|---|---|---|---|---|---|---|---|---|
| Comp. Ex. 1 | Straightness | 0 | Good | 1 | Bad | 0.54 | Good | Bad |
| Example 3 | Straightness | 0 | Good | 0 | Good | 0.80 | Good | Good |
| Example 5 | Straightness | 0 | Good | 0 | Good | 0.80 | Good | Good |
| Comp. Ex. 8 | Straightness | 0 | Good | 0 | Good | 0.80 | Good | Bad |
| Comp. Ex. 9 | Straightness | 0 | Good | 0 | Good | 0.80 | Good | Bad |
| Comp. Ex. 10 | Straightness | 0 | Good | 0 | Good | 0.80 | Good | Bad |
| Comp. Ex. 11 | Straightness | 0 | Good | 0 | Good | 0.80 | Good | Bad |

Examples 6 to 8 Comparative Examples 12 to 15

A cured polyurethane resin material was cut by the use of an end mill to manufacture conveyance receivers of Examples 6 to 8, and Comparative Examples 12 to 15 in the same manner as in Example 3. At this time, the receivers had a support face having a straight tolerance of 100 μm, an arithmetic mean height of 20 μm, a porosity of 64%, and an apparent specific gravity of 400 kg/m³ with the profile tolerance and the shore D hardness as shown in Table 3. The conveyance receivers of Examples 6 to 8 and Comparative Examples 12 to 15 were subjected to a honeycomb formed article conveyance experiment in the same manner as in Example 3 to give a judgment for each item and a total judgment of each receiver with the hardness as the reference. The results are shown in Table 3.

TABLE 3

| | Judgment requirement | Profile tolerance (μm) | Straightness tolerance (μm) | Shore D hardness | Arithmetic mean height (μm) | Porosity (%) | Apparent specific gravity (g/cm³) |
|---|---|---|---|---|---|---|---|
| Comp. Ex. 1 | Hardness | 500 | 700 | 30 | 40 | 75 | 270 |
| Comp. Ex. 12 | Hardness | 1500 | 100 | 20 | 20 | 64 | 400 |
| Comp. Ex. 13 | Hardness | 600 | 100 | 30 | 20 | 64 | 400 |
| Example 6 | Hardness | 250 | 100 | 40 | 20 | 64 | 400 |
| Example 3 | Hardness | 200 | 100 | 50 | 20 | 64 | 400 |
| Example 7 | Hardness | 190 | 100 | 60 | 20 | 64 | 400 |
| Example 8 | Hardness | 180 | 100 | 70 | 20 | 64 | 400 |
| Comp. Ex. 14 | Hardness | 120 | 100 | 80 | 20 | 64 | 400 |
| Comp. Ex. 15 | Hardness | 100 | 100 | 90 | 20 | 64 | 400 |

| | | A | | B | | C | | D | |
| | | | | Rib | Judgment | Rough | Judgment | | |
| | Judgment requirement | Contact defective rate (%) | Judgment of contact defect <0.5% | deformation defective rate (%) | of rib deformation defect <0.5% | surface defective rate (%) | of rough surface defect <0.5% | Release defective rate (%) | Judgment of release defect <0.5% |
|---|---|---|---|---|---|---|---|---|---|
| Comp. Ex. 1 | Hardness | 2.0 | Bad | 5.0 | Bad | 3.0 | Bad | 0.0 | Good |
| Comp. Ex. 12 | Hardness | 15.0 | Bad | 0.0 | Good | 0.0 | Good | 0.0 | Good |
| Comp. Ex. 13 | Hardness | 3.0 | Bad | 0.0 | Good | 0.0 | Good | 0.0 | Good |
| Example 6 | Hardness | 0.0 | Good | 0.0 | Good | 0.0 | Good | 0.0 | Good |
| Example 3 | Hardness | 0.0 | Good | 0.0 | Good | 0.0 | Good | 0.0 | Good |
| Example 7 | Hardness | 0.0 | Good | 0.0 | Good | 0.0 | Good | 0.0 | Good |
| Example 8 | Hardness | 0.0 | Good | 0.0 | Good | 0.0 | Good | 0.0 | Good |
| Comp. Ex. 14 | Hardness | 0.0 | Good | 0.0 | Good | 0.0 | Good | 0.0 | Good |
| Comp. Ex. 15 | Hardness | 0.0 | Good | 0.0 | Good | 0.0 | Good | 0.0 | Good |

TABLE 3-continued

| | | E | | F | | G | |
| --- | --- | --- | --- | --- | --- | --- | --- |
| | | Receiver | Judgment of | | | Number of | |
| | Judgment requirement | deformation contact defective rate (%) | receiver deformation contact defect <0.05% | Processing time (min./unit) | Judgment of processing time ≦30 min. | receivers processed by one drill (unit(s)) | Judgment of drill life span >10 receivers |
| Comp. Ex. 1 | Hardness | 4.0 | Bad | 20 | Good | 20 | Good |
| Comp. Ex. 12 | Hardness | 10.5 | Bad | 20 | Good | 20 | Good |
| Comp. Ex. 13 | Hardness | 3.5 | Bad | 20 | Good | 20 | Good |
| Example 6 | Hardness | 0.0 | Good | 30 | Good | 20 | Good |
| Example 3 | Hardness | 0.0 | Good | 30 | Good | 20 | Good |
| Example 7 | Hardness | 0.0 | Good | 30 | Good | 18 | Good |
| Example 8 | Hardness | 0.0 | Good | 30 | Good | 14 | Good |
| Comp. Ex. 14 | Hardness | 0.0 | Good | 45 | Bad | 9 | Bad |
| Comp. Ex. 15 | Hardness | 0.0 | Good | 60 | Bad | 5 | Bad |

| | | H | | I | | J | | |
| --- | --- | --- | --- | --- | --- | --- | --- | --- |
| | | Crack | | Impact contact | Judgment of impact | | | |
| | Judgment requirement | defective rate (%) | Judgment of crack defect <0.5% | defective rate (%) | contact defect <0.5% | Receiver weight (kg) | Judgment of workability ≦2 kg | Total judgment on receiver |
| Comp. Ex. 1 | Hardness | 0 | Good | 1 | Bad | 0.54 | Good | Bad |
| Comp. Ex. 12 | Hardness | 0 | Good | 0 | Good | 0.80 | Good | Bad |
| Comp. Ex. 13 | Hardness | 0 | Good | 0 | Good | 0.80 | Good | Bad |
| Example 6 | Hardness | 0 | Good | 0 | Good | 0.80 | Good | Good |
| Example 3 | Hardness | 0 | Good | 0 | Good | 0.80 | Good | Good |
| Example 7 | Hardness | 0 | Good | 0 | Good | 0.80 | Good | Good |
| Example 8 | Hardness | 0 | Good | 0 | Good | 0.80 | Good | Good |
| Comp. Ex. 14 | Hardness | 0 | Good | 0 | Good | 0.80 | Good | Bad |
| Comp. Ex. 15 | Hardness | 0 | Good | 0 | Good | 0.80 | Good | Bad |

Examples 9 to 11, Comparative Examples 16 to 19

A cured polyurethane resin material was cut by the use of an end mill to manufacture conveyance receivers of Examples 9 to 11 and Comparative Examples 16 to 19 in the same manner as in Example 3. At this time, the receivers had a support face having a profile tolerance of 20 μm, a straightness tolerance of 10 μm, a shore D hardness of 50, a porosity of 64%, and an apparent specific gravity of 400 kg/m³ with the arithmetic mean height as shown in Table 4. The conveyance receivers of Examples 9 to 11 and Comparative Examples 16 to 19 were subjected to a honeycomb formed article conveyance experiment in the same manner as in Example 3 to give a judgment for each item and a total judgment of each receiver with the arithmetic mean height as the reference. The results are shown in Table 4.

TABLE 4

| | Judgment requirement | Profile tolerance (μm) | Straightness tolerance (μm) | Shore D hardness | Arithmetic mean height (μm) | Porosity (%) | Apparent specific gravity (g/cm³) |
| --- | --- | --- | --- | --- | --- | --- | --- |
| Comp. Ex. 1 | Arithmetic mean height | 500 | 700 | 30 | 40 | 75 | 270 |
| Comp. Ex. 16 | Arithmetic mean height | 200 | 100 | 50 | 5 | 64 | 400 |
| Example 9 | Arithmetic mean height | 200 | 100 | 50 | 10 | 64 | 400 |
| Example 10 | Arithmetic mean height | 200 | 100 | 50 | 15 | 64 | 400 |
| Example 3 | Arithmetic mean height | 200 | 100 | 50 | 20 | 64 | 400 |
| Example 11 | Arithmetic mean height | 200 | 100 | 50 | 30 | 64 | 400 |
| Comp. Ex. 17 | Arithmetic mean height | 200 | 100 | 50 | 40 | 64 | 400 |
| Comp. Ex. 18 | Arithmetic mean height | 200 | 100 | 50 | 80 | 64 | 400 |
| Comp. Ex. 19 | Arithmetic mean height | 200 | 100 | 50 | 160 | 64 | 400 |

TABLE 4-continued

|  | Judgment requirement | A Contact defective rate (%) | Judgment of contact defect <0.5% | B Rib deformation defective rate (%) | Judgment of rib deformation defect <0.5% | C Rough surface defective rate (%) | Judgment of rough surface defect <0.5% | D Release defective rate (%) | Judgment of release defect <0.5% |
|---|---|---|---|---|---|---|---|---|---|
| Comp. Ex. 1 | Arithmetic mean height | 2.0 | Bad | 5.0 | Bad | 3.0 | Bad | 0.0 | Good |
| Comp. Ex. 16 | Arithmetic mean height | 0.0 | Good | 0.0 | Good | 0.0 | Good | 12.5 | Bad |
| Example 9 | Arithmetic mean height | 0.0 | Good | 0.0 | Good | 0.0 | Good | 0.0 | Good |
| Example 10 | Arithmetic mean height | 0.0 | Good | 0.0 | Good | 0.0 | Good | 0.0 | Good |
| Example 3 | Arithmetic mean height | 0.0 | Good | 0.0 | Good | 0.0 | Good | 0.0 | Good |
| Example 11 | Arithmetic mean height | 0.0 | Good | 0.0 | Good | 0.0 | Good | 0.0 | Good |
| Comp. Ex. 17 | Arithmetic mean height | 0.0 | Good | 0.0 | Good | 2.5 | Bad | 0.0 | Good |
| Comp. Ex. 18 | Arithmetic mean height | 0.0 | Good | 0.0 | Good | 4.5 | Bad | 0.0 | Good |
| Comp. Ex. 19 | Arithmetic mean height | 0.0 | Good | 0.0 | Good | 9.5 | Bad | 0.0 | Good |

|  | Judgment requirement | E Receiver deformation contact defective rate (%) | Judgment of receiver deformation contact defect <0.05% | F Processing time (min./unit) | Judgment of processing time ≦30 min. | G Number of receivers processed by one drill (unit(s)) | Judgment of drill life span >10 receivers |
|---|---|---|---|---|---|---|---|
| Comp. Ex. 1 | Arithmetic mean height | 4.0 | Bad | 20 | Good | 20 | Good |
| Comp. Ex. 16 | Arithmetic mean height | 0.0 | Good | 30 | Good | 20 | Good |
| Example 9 | Arithmetic mean height | 0.0 | Good | 30 | Good | 20 | Good |
| Example 10 | Arithmetic mean height | 0.0 | Good | 30 | Good | 20 | Good |
| Example 3 | Arithmetic mean height | 0.0 | Good | 30 | Good | 20 | Good |
| Example 11 | Arithmetic mean height | 0.0 | Good | 30 | Good | 20 | Good |
| Comp. Ex. 17 | Arithmetic mean height | 0.0 | Good | 30 | Good | 20 | Good |
| Comp. Ex. 18 | Arithmetic mean height | 0.0 | Good | 30 | Good | 20 | Good |
| Comp. Ex. 19 | Arithmetic mean height | 0.0 | Good | 30 | Good | 20 | Good |

|  | Judgment requirement | H Crack defective rate (%) | Judgment of crack defect <0.5% | I Impact contact defective rate (%) | Judgment of impact contact defect <0.5% | J Receiver weight (kg) | Judgment of workability ≦2 kg | Total judgment on receiver |
|---|---|---|---|---|---|---|---|---|
| Comp. Ex. 1 | Arithmetic mean height | 0 | Good | 1 | Bad | 0.54 | Good | Bad |
| Comp. Ex. 16 | Arithmetic mean height | 0 | Good | 0 | Good | 0.80 | Good | Bad |
| Example 9 | Arithmetic mean height | 0 | Good | 0 | Good | 0.80 | Good | Good |
| Example 10 | Arithmetic mean height | 0 | Good | 0 | Good | 0.80 | Good | Good |
| Example 3 | Arithmetic mean height | 0 | Good | 0 | Good | 0.80 | Good | Good |
| Example 11 | Arithmetic mean height | 0 | Good | 0 | Good | 0.80 | Good | Good |
| Comp. Ex. 17 | Arithmetic mean height | 0 | Good | 0 | Good | 0.80 | Good | Bad |

TABLE 4-continued

| | | | | | | | | |
|---|---|---|---|---|---|---|---|---|
| Comp. Ex. 18 | Arithmetic mean height | 0 | Good | 0 | Good | 0.80 | Good | Bad |
| Comp. Ex. 19 | Arithmetic mean height | 0 | Good | 0 | Good | 0.80 | Good | Bad |

Examples 12 to 16 Comparative Examples 20, 21

A cured polyurethane resin material was cut by the use of an end mill to manufacture conveyance receivers of Examples 12 to 16 and Comparative Examples 20 and 21 in the same manner as in Example 3. At this time, the receivers had a support face having a straightness tolerance of 100 μm, a shore D hardness of 50, an arithmetic mean height of 20 μm, and an apparent specific gravity of 400 kg/m³ with the profile tolerance and the porosity as shown in Table 5. The conveyance receivers of Examples 12 to 16 and Comparative Examples 20 and 21 were subjected to a honeycomb formed article conveyance experiment in the same manner as in Example 3 to give a judgment for each item and a total judgment of each receiver with the porosity as the reference. The results are shown in Table 5.

TABLE 5

| | Judgment requirement | Profile tolerance (μm) | Straightness tolerance (μm) | Shore D hardness | Arithmetic mean height (μm) | Porosity (%) | Apparent specific gravity (g/cm³) |
|---|---|---|---|---|---|---|---|
| Comp. Ex. 1 | Porosity | 500 | 700 | 30 | 40 | 75 | 270 |
| Comp. Ex. 20 | Porosity | 650 | 100 | 50 | 20 | 85 | 400 |
| Example 12 | Porosity | 240 | 100 | 50 | 20 | 75 | 400 |
| Example 3 | Porosity | 200 | 100 | 50 | 20 | 64 | 400 |
| Example 13 | Porosity | 170 | 100 | 50 | 20 | 55 | 400 |
| Example 14 | Porosity | 140 | 100 | 50 | 20 | 46 | 400 |
| Example 15 | Porosity | 120 | 100 | 50 | 20 | 32 | 400 |
| Example 16 | Porosity | 110 | 100 | 50 | 20 | 10 | 400 |
| Comp. Ex. 21 | Porosity | 110 | 100 | 50 | 20 | 5 | 400 |

| | | A | | B | | C | | D | |
|---|---|---|---|---|---|---|---|---|---|
| | Judgment requirement | Contact defective rate (%) | Judgment of contact defect <0.5% | Rib deformation defective rate (%) | Judgment of rib deformation defect <0.5% | Rough surface defective rate (%) | Judgment of rough surface defect <0.5% | Release defective rate (%) | Judgment of release defect <0.5% |
| Comp. Ex. 1 | Porosity | 2.0 | Bad | 5.0 | Bad | 3.0 | Bad | 0.0 | Good |
| Comp. Ex. 20 | Porosity | 3.0 | Bad | 0.0 | Good | 0.0 | Good | 0.0 | Good |
| Example 12 | Porosity | 0.0 | Good | 0.0 | Good | 0.0 | Good | 0.0 | Good |
| Example 3 | Porosity | 0.0 | Good | 0.0 | Good | 0.0 | Good | 0.0 | Good |
| Example 13 | Porosity | 0.0 | Good | 0.0 | Good | 0.0 | Good | 0.0 | Good |
| Example 14 | Porosity | 0.0 | Good | 0.0 | Good | 0.0 | Good | 0.0 | Good |
| Example 15 | Porosity | 0.0 | Good | 0.0 | Good | 0.0 | Good | 0.0 | Good |
| Example 16 | Porosity | 0.0 | Good | 0.0 | Good | 0.0 | Good | 0.0 | Good |
| Comp. Ex. 21 | Porosity | 0.0 | Good | 0.0 | Good | 0.0 | Good | 0.0 | Good |

| | | E | | F | | G | |
|---|---|---|---|---|---|---|---|
| | Judgment requirement | Receiver deformation contact defective rate (%) | Judgment of receiver deformation contact defect <0.05% | Processing time (min./unit) | Judgment of processing time ≦30 min. | Number of receivers processed by one drill (unit(s)) | Judgment of drill life span >10 receivers |
| Comp. Ex. 1 | Porosity | 4.0 | Bad | 20 | Good | 20 | Good |
| Comp. Ex. 20 | Porosity | 0.0 | Good | 20 | Good | 20 | Good |
| Example 12 | Porosity | 0.0 | Good | 20 | Good | 20 | Good |
| Example 3 | Porosity | 0.0 | Good | 20 | Good | 20 | Good |
| Example 13 | Porosity | 0.0 | Good | 20 | Good | 20 | Good |
| Example 14 | Porosity | 0.0 | Good | 20 | Good | 20 | Good |
| Example 15 | Porosity | 0.0 | Good | 20 | Good | 20 | Good |
| Example 16 | Porosity | 0.0 | Good | 20 | Good | 20 | Good |
| Comp. Ex. 21 | Porosity | 0.0 | Good | 20 | Good | 20 | Good |

TABLE 5-continued

|  | Judgment requirement | H Crack defective rate (%) | Judgment of crack defect <0.5% | Impact contact defective rate (%) | I Judgment of impact contact defect <0.5% | J Receiver weight (kg) | Judgment of workability ≦2 kg | Total judgment on receiver |
|---|---|---|---|---|---|---|---|---|
| Comp. Ex. 1 | Porosity | 0 | Good | 1 | Bad | 0.54 | Good | Bad |
| Comp. Ex. 20 | Porosity | 0 | Good | 0 | Good | 0.80 | Good | Bad |
| Example 12 | Porosity | 0 | Good | 0 | Good | 0.80 | Good | Good |
| Example 3 | Porosity | 0 | Good | 0 | Good | 0.80 | Good | Good |
| Example 13 | Porosity | 0 | Good | 0 | Good | 0.80 | Good | Good |
| Example 14 | Porosity | 0 | Good | 0 | Good | 0.80 | Good | Good |
| Example 15 | Porosity | 0 | Good | 0 | Good | 0.80 | Good | Good |
| Example 16 | Porosity | 0 | Good | 0 | Good | 0.80 | Good | Good |
| Comp. Ex. 21 | Porosity | 3.5 | Bad | 0 | Good | 0.80 | Good | Bad |

Examples 17 to 21, Comparative Examples 22 to 25

A cured polyurethane resin material was cut by the use of an end mill to manufacture conveyance receivers of Examples 17 to 21 and Comparative Examples 22 to 25 in the same manner as in Example 3. At this time, the receivers had a support face having a profile tolerance of 200 μm, a straightness tolerance of 100 μm, a shore D hardness of 50, an arithmetic mean height of 20 μm, and a porosity of 64%, with the apparent specific gravity as shown in Table 6. The conveyance receivers of Examples 17 to 21 and Comparative Examples 22 to 25 were subjected to a honeycomb formed article conveyance experiment in the same manner as in Example 3 to give a judgment for each item and a total judgment of each receiver with the apparent specific gravity (density) as the reference. The results are shown in Table 6.

TABLE 6

|  | Judgment requirement | Profile tolerance (μm) | Straightness tolerance (μm) | Shore D hardness | Arithmetic mean height (μm) | Porosity (%) | Apparent specific gravity (g/cm³) |
|---|---|---|---|---|---|---|---|
| Comp. Ex. 1 | Density | 500 | 700 | 30 | 40 | 75 | 270 |
| Comp. Ex. 22 | Density | 200 | 100 | 50 | 20 | 64 | 100 |
| Comp. Ex. 23 | Density | 200 | 100 | 50 | 20 | 64 | 200 |
| Example 17 | Density | 200 | 100 | 50 | 20 | 64 | 300 |
| Example 3 | Density | 200 | 100 | 50 | 20 | 64 | 400 |
| Example 18 | Density | 200 | 100 | 50 | 20 | 64 | 500 |
| Example 19 | Density | 200 | 100 | 50 | 20 | 64 | 600 |
| Example 20 | Density | 200 | 100 | 50 | 20 | 64 | 800 |
| Example 21 | Density | 200 | 100 | 50 | 20 | 64 | 1000 |
| Comp. Ex. 24 | Density | 200 | 100 | 50 | 20 | 64 | 1200 |
| Comp. Ex. 25 | Density | 200 | 100 | 50 | 20 | 64 | 1500 |

|  | Judgment requirement | A Contact defective rate (%) | Judgment of contact defect <0.5% | B Rib deformation defective rate (%) | Judgment of rib deformation defect <0.5% | C Rough surface defective rate (%) | Judgment of rough surface defect <0.5% | D Release defective rate (%) | Judgment of release defect <0.5% |
|---|---|---|---|---|---|---|---|---|---|
| Comp. Ex. 1 | Density | 2.0 | Bad | 5.0 | Bad | 3.0 | Bad | 0.0 | Good |
| Comp. Ex. 22 | Density | 0.0 | Good | 0.0 | Good | 0.0 | Good | 0.0 | Good |
| Comp. Ex. 23 | Density | 0.0 | Good | 0.0 | Good | 0.0 | Good | 0.0 | Good |
| Example 17 | Density | 0.0 | Good | 0.0 | Good | 0.0 | Good | 0.0 | Good |
| Example 3 | Density | 0.0 | Good | 0.0 | Good | 0.0 | Good | 0.0 | Good |
| Example 18 | Density | 0.0 | Good | 0.0 | Good | 0.0 | Good | 0.0 | Good |
| Example 19 | Density | 0.0 | Good | 0.0 | Good | 0.0 | Good | 0.0 | Good |
| Example 20 | Density | 0.0 | Good | 0.0 | Good | 0.0 | Good | 0.0 | Good |
| Example 21 | Density | 0.0 | Good | 0.0 | Good | 0.0 | Good | 0.0 | Good |
| Comp. Ex. 24 | Density | 0.0 | Good | 0.0 | Good | 0.0 | Good | 0.0 | Good |
| Comp. Ex. 25 | Density | 0.0 | Good | 0.0 | Good | 0.0 | Good | 0.0 | Good |

TABLE 6-continued

| | | E | | F | | G | |
|---|---|---|---|---|---|---|---|
| | | Receiver | Judgment of | | | Number of | |
| | Judgment requirement | deformation contact defective rate (%) | receiver deformation contact defect <0.05% | Processing time (min./unit) | Judgment of processing time ≦30 min. | receivers processed by one drill (uint(s)) | Judgment of drill life span >10 receivers |
| Comp. Ex. 1 | Density | 4.0 | Bad | 20 | Good | 20 | Good |
| Comp. Ex. 22 | Density | 0.0 | Good | 20 | Good | 20 | Good |
| Comp. Ex. 23 | Density | 0.0 | Good | 20 | Good | 20 | Good |
| Example 17 | Density | 0.0 | Good | 20 | Good | 20 | Good |
| Example 3 | Density | 0.0 | Good | 20 | Good | 20 | Good |
| Example 18 | Density | 0.0 | Good | 20 | Good | 20 | Good |
| Example 19 | Density | 0.0 | Good | 20 | Good | 20 | Good |
| Example 20 | Density | 0.0 | Good | 20 | Good | 20 | Good |
| Example 21 | Density | 0.0 | Good | 20 | Good | 20 | Good |
| Comp. Ex. 24 | Density | 0.0 | Good | 20 | Good | 20 | Good |
| Comp. Ex. 25 | Density | 0.0 | Good | 20 | Good | 20 | Good |

| | | H | | I | | J | | |
|---|---|---|---|---|---|---|---|---|
| | | Crack | | Impact | Judgment of | | | |
| | Judgment requirement | defective rate (%) | Judgment of crack defect <0.5% | contact defective rate (%) | impact contact defect <0.5% | Receiver weight (kg) | Judgment of workability ≦2 kg | Total judgment on receiver |
| Comp. Ex. 1 | Density | 0.0 | Good | 1 | Bad | 0.54 | Good | Bad |
| Comp. Ex. 22 | Density | 0.0 | Good | 2.5 | Bad | 0.20 | Good | Bad |
| Comp. Ex. 23 | Density | 0.0 | Good | 2 | Bad | 0.40 | Good | Bad |
| Example 17 | Density | 0.0 | Good | 0 | Good | 0.60 | Good | Good |
| Example 3 | Density | 0.0 | Good | 0 | Good | 0.80 | Good | Good |
| Example 18 | Density | 0.0 | Good | 0 | Good | 1.00 | Good | Good |
| Example 19 | Density | 0.0 | Good | 0 | Good | 1.20 | Good | Good |
| Example 20 | Density | 0.0 | Good | 0 | Good | 1.60 | Good | Good |
| Example 21 | Density | 0.0 | Good | 0 | Good | 2.00 | Good | Good |
| Comp. Ex. 24 | Density | 0.0 | Good | 0 | Good | 2.40 | Bad | Bad |
| Comp. Ex. 25 | Density | 0.0 | Good | 0 | Good | 3.00 | Bad | Bad |

From the results of Table 1, it was found out that, when the profile tolerance of the support face of the conveyance receiver is above 300 μm, a contact defect due to contact of the outer periphery of the honeycomb formed article conveyed with the support face increases. From the results of Table 2, it was found out that, when the straightness tolerance of the support face is above 200 mμ, a rib deformation defect is easily caused in the lower portion of the honeycomb formed article conveyed.

From the results of Table 3, it was found out that, when the Shore D hardness of the receiver material is below 40, since high processing accuracy cannot be obtained, and the profile tolerance of the support face of the conveyance receiver increases, a contact defect due to contact of the outer periphery of the honeycomb formed article conveyed with the support face increases. In addition, it was found out that, when the Shore D hardness of the receiver material is below 40, since the support face of the conveyance receiver becomes soft to cause deformation of the support face by its own weight of the honeycomb formed article conveyed, the receiver deformation contact defect due to contact of the outer periphery of the honeycomb formed article conveyed with the deformed support face increases. On the other hand, it was found out that, when the Shore D hardness of the receiver material is above 70, cost problems such as cutting processing requiring long time and shortened life span of the cutting drill are caused.

From the results of Table 4, it was found out that, when the arithmetic mean height of the support face of the conveyance receiver is below 10 μm, the outer periphery of the honeycomb formed article conveyed adheres to the support face to easily cause a defect in the honeycomb formed article upon releasing it. On the other hand, it was found out that, when the arithmetic mean height of the support face is above 34 μm, friction between the outer periphery of a honeycomb formed article conveyed and the support face increases to easily cause a rough surface defect in the outer periphery of a honeycomb formed article.

From the results of Table 5, it was found out that, when the porosity of the receiver material is above 75%, since high processing accuracy cannot be obtained because of insufficient rigidity of a receiver material to increase the profile tolerance of the support face of the conveyance receiver, a contact defect due to the contact of the outer periphery of the honeycomb formed article conveyed with the support face increases. On the other hand, it was found out that, when the porosity of the receiver is below 10%, since unevenness of the water content inside the honeycomb formed article conveyed is caused due to deterioration of the hygroscopicity of the support face of the conveyance receiver, there arises a problem of a crack caused in the honeycomb structure obtained.

From the results of Table 6, it was found out that, when the apparent specific gravity of the receiver material is below 300 kg/m$^3$, since the stability upon conveyance deteriorates because the conveyance receiver manufactured is light to easily cause an impact contact defect in the honeycomb formed article by the vibration transmitted to the honeycomb formed article conveyed. On the other hand, it was found out that, when the apparent specific gravity of the receiver material is above 1000 kg/m³, the conveyance receiver manufactured is heavy to cause deterioration in workability.

Since a conveyance receiver of a honeycomb formed article of the present invention can hold and convey a soft clayey honeycomb formed article without causing a deformation, a crack, a damage, or the like and can be manufactured simply at low costs, it is greatly worth industrial use.

What is claimed is:

1. A conveyance receiver for supporting a clayey honeycomb formed article extruded from a die and conveying the honeycomb formed article on a conveyance path to the next step, the conveyance receiver comprising:
    a bottom face formed in parallel with the conveyance path to abut against the conveyance path, and
    a support face formed to match a shape of a part of an outer periphery of the honeycomb formed article and support the honeycomb formed article;
    wherein at least the support face is made of a cured porous polyurethane resin material having a Shore D hardness Hs of $40 \leqq Hs \leqq 70$.

2. A conveyance receiver for a honeycomb formed article according to claim 1, wherein the support face is formed so that the profile tolerance C is in the range of $C \leqq 300$ μm toward the outside in the radial direction of the honeycomb formed article when a design value based on a shape of the part of the outer periphery of the honeycomb formed article to be supported is employed as a reference, and
    the straightness tolerance Sa of the line connecting two points closest to the bottom face in both the end portions in the conveyance direction is in the range of $Sa \leqq 200$ μm when a design value based on the bottom face is employed as a reference.

3. A conveyance receiver for a honeycomb formed article according to claim 1, wherein at least the support face is made of the cured porous polyurethane resin material having a porosity Po in the range of $10\% \leqq Po \leqq 75\%$.

4. A conveyance receiver for a honeycomb formed article according to claim 2, wherein at least the support face is made of the cured porous polyurethane resin material having a porosity Po in the range of $10\% \leqq Po \leqq 75\%$.

5. A conveyance receiver for a honeycomb formed article according to claim 1, wherein at least the support face is made of the cured porous polyurethane resin material having an apparent specific gravity D in the range of $300 \text{ kg/m}^3 \leqq D \leqq 1000 \text{ kg/m}^3$.

6. A conveyance receiver for a honeycomb formed article according to claim 2, wherein at least the support face is made of the cured porous polyurethane resin material having an apparent specific gravity D in the range of $300 \text{ kg/m}^3 \leqq D \leqq 1000 \text{ kg/m}^3$.

7. A conveyance receiver for a honeycomb formed article according to claim 3, wherein at least the support face is made of the cured porous polyurethane resin material having an apparent specific gravity D in the range of $300 \text{ kg/m}^3 \leqq D \leqq 1000 \text{ kg/m}^3$.

8. A conveyance receiver for a honeycomb formed article according to claim 4, wherein at least the support face is made of the cured porous polyurethane resin material having an apparent specific gravity D in the range of $300 \text{ kg/m}^3 \leqq D \leqq 1000 \text{ kg/m}^3$.

9. A conveyance receiver for a honeycomb formed article according to claim 1, wherein the support face is formed to have an arithmetic mean height Ra in the range of $10 \text{ μm} \leqq Ra \leqq 30 \text{ μm}$.

10. A conveyance receiver for a honeycomb formed article according to claim 2, wherein the support face is formed to have an arithmetic mean height Ra in the range of $10 \text{ μm} \leqq Ra \leqq 30 \text{ μm}$.

11. A conveyance receiver for a honeycomb formed article according to claim 3, wherein the support face is formed to have an arithmetic mean height Ra in the range of $10 \text{ μm} \leqq Ra \leqq 30 \text{ μm}$.

12. A conveyance receiver for a honeycomb formed article according to claim 4, wherein the support face is formed to have an arithmetic mean height Ra in the range of $10 \text{ μm} \leqq Ra \leqq 30 \text{ μm}$.

13. A conveyance receiver for a honeycomb formed article according to claim 5, wherein the support face is formed to have an arithmetic mean height Ra in the range of $10 \text{ μm} \leqq Ra \leqq 30 \text{ μm}$.

14. A conveyance receiver for a honeycomb formed article according to claim 6, wherein the support face is formed to have an arithmetic mean height Ra in the range of $10 \text{ μm} \leqq Ra \leqq 30 \text{ μm}$.

15. A conveyance receiver for a honeycomb formed article according to claim 7, wherein the support face is formed to have an arithmetic mean height Ra in the range of $10 \text{ μm} \leqq Ra \leqq 30 \text{ μm}$.

16. A conveyance receiver for a honeycomb formed article according to claim 8, wherein the support face is formed to have an arithmetic mean height Ra in the range of $10 \text{ μm} \leqq Ra \leqq 30 \text{ μm}$.

17. A conveyance receiver for a honeycomb formed article according to claim 1, wherein the cured porous polyurethane resin material is chemical wood.

18. A conveyance receiver for a honeycomb formed article according to claim 2, wherein the cured porous polyurethane resin material is chemical wood.

19. A conveyance apparatus using a conveyance receiver for a honeycomb formed article according to claim 1, the conveyance apparatus comprising:
    a conveyance path for placing and carrying the conveyance receiver supporting the honeycomb formed article,
    a receiver collection portion for collecting an empty conveyance receiver after conveying a formed article, and
    a receiver supply portion for supplying the collected conveyance receiver to the conveyance path again;
    wherein the conveyance path is positioned so that the straightness tolerance Sb of the line passing through the center in the width direction of the face for placing the receiver and extending in the conveyance direction of the conveyance path is in the range of $Sb \leqq 500$ μm when the design value set in parallel with a line passing through the center of the open portion of the die and extending in a horizontal direction is employed as a reference.

20. A conveyance method using a conveyance apparatus for a honeycomb formed article according to claim 19, the method comprising:
    a honeycomb formed article extrusion step where a ceramic material having a compression stress of 20 to 30 kPa at a compression strain of 2% is successively extruded from an extruder provided with the die at the outlet to obtain the honeycomb formed article having a columnar shape, a receiver support step where the extruded honeycomb formed article is supported by the empty conveyance receiver supplied by the receiver supply portion, and a conveyance step where the honeycomb formed article held by the conveyance receiver is conveyed to the next step at an almost the same rate as the extrusion rate of the honeycomb formed article.

* * * * *